(No Model.) 2 Sheets—Sheet 1.

C. HARTMANN.
POTATO DIGGER.

No. 590,571. Patented Sept. 28, 1897.

Witnesses:
John Becker.
William Miller.

Inventor:
Carl Hartmann
by his attorneys
Roeder & Brieren (No Model.)  2 Sheets—Sheet 2.

C. HARTMANN.
POTATO DIGGER.

No. 590,571. Patented Sept. 28, 1897.

Witnesses:
John Becker.
William Miller.

Inventor:
Carl Hartmann
by his attorneys
Roeder & Brieren

UNITED STATES PATENT OFFICE.

CARL HARTMANN, OF BROOKLYN, NEW YORK, ASSIGNOR OF ONE-HALF TO ELIZABETH SHOCH, OF BLISSVILLE, NEW YORK.

POTATO-DIGGER.

SPECIFICATION forming part of Letters Patent No. 590,571, dated September 28, 1897.

Application filed May 19, 1897. Serial No. 637,236. (No model.)

*To all whom it may concern:*

Be it known that I, CARL HARTMANN, of Brooklyn, county of Kings, and State of New York, have invented an Improved Potato-Digger, of which the following is a specification.

This invention relates to a potato-digger of improved construction and by means of which the potatoes may be quickly dug up, screened, assorted, and bagged.

The invention consists in the various features of construction more fully pointed out in the claims.

Figure 1:
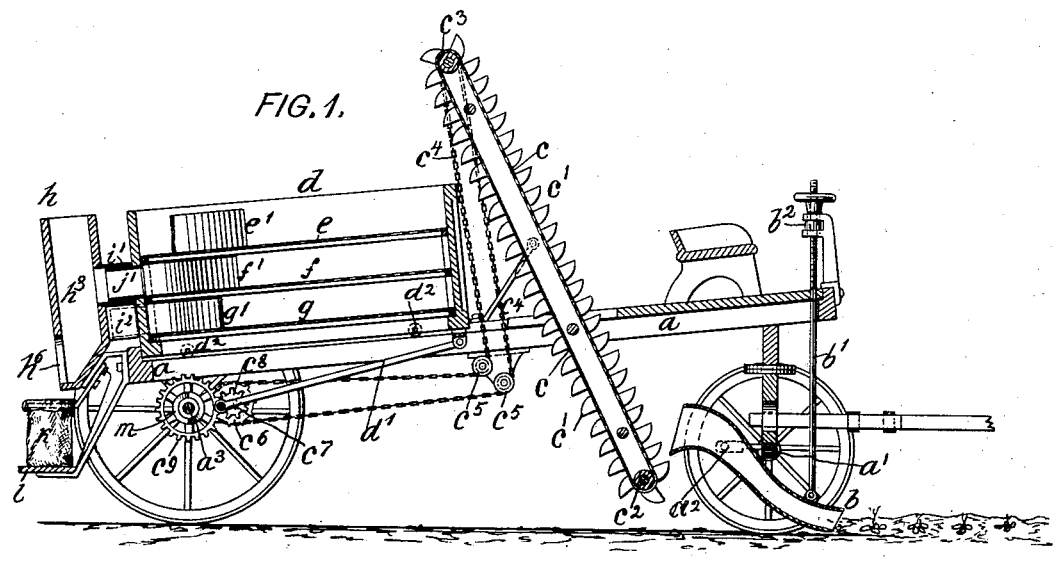
Figure 2:
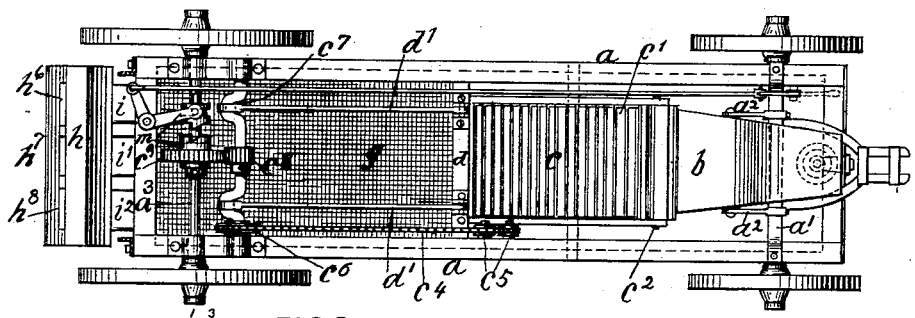
Figure 3:
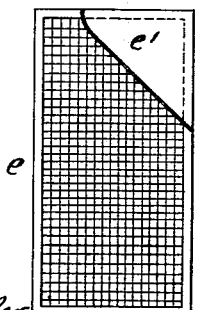
Figure 4:
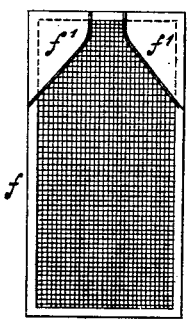
Figure 5:
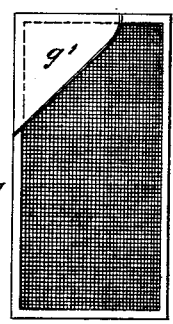
Figure 6:
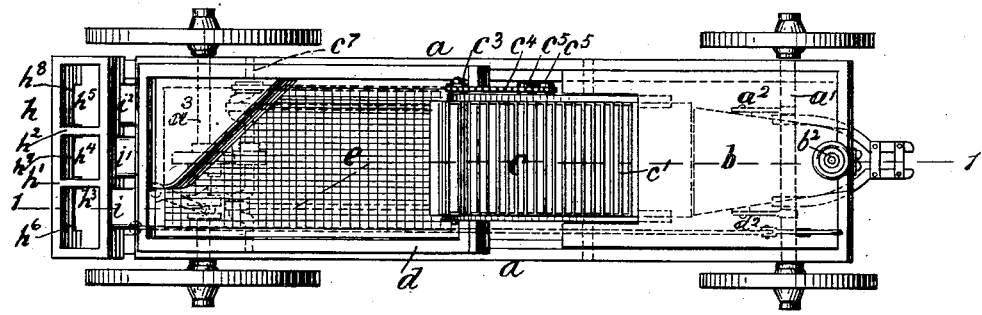
Figure 7:
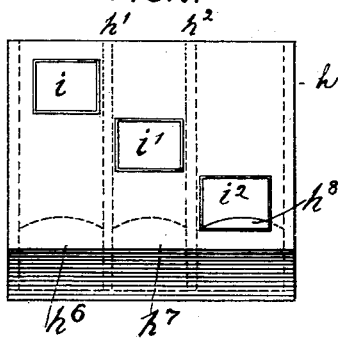
Figure 8:
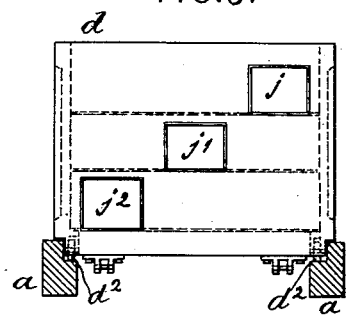
Figure 9:
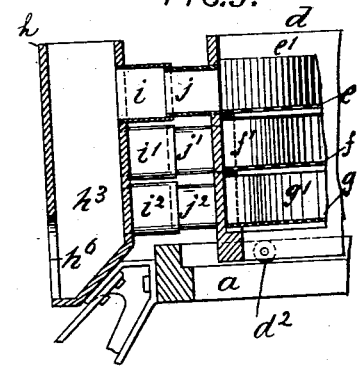

In the accompanying drawings, Figure 1 is a vertical longitudinal section of the potato-digger on line 1 1, Fig. 6; Fig. 2, an inverted plan. Figs. 3, 4, and 5 are plans of screens $e\,f\,g$, respectively; Fig. 6, a plan of the machine; Fig. 7, a front view of the delivery-hopper; Fig. 8, an end view of the screen-box, and Fig. 9 a vertical longitudinal section through the hopper and the rear end of the screen-box.

The letter $a$ represents the frame of the machine, to the front fixed axle $a'$ of which there is secured, by arms $a^2$, the hinged plowshare or scoop $b$, adapted to raise the potatoes out of the ground. This plowshare may be adjusted vertically by means of the screw-rod $b'$, carrying nut $b^2$, and is shown to be made in the form of a flattened tube. The rear end of this tube delivers the potatoes upon the blades $c'$ of an endless conveyer $c$, formed of wire-netting, through the meshes of which some of the earth is discharged, and which travels over lower roller $c^2$ and upper roller $c^3$. The upper roller $c^3$ receives motion by chain $c^4$, passing over idlers $c^5$ and driven by chain-wheel $c^6$, fixed on crank-shaft $c^7$, having cog-wheel $c^8$, that meshes into cog-wheel $c^9$, mounted on the revoluble rear axle $a^3$ of the machine. The conveyer $c$ raises the potatoes and dumps them into a rearwardly-inclined and bottomless sieve-box $d$, that receives reciprocating motion from crank-shaft $c^7$, by means of pitmen $d'$, and which is mounted on rolls $d^2$, traveling on rabbeted longitudinal rails of the frame $a$, Figs. 8 and 9.

Within the box $d$ are placed three (more or less) superposed screens $e\,f\,g$, forming horizontal chambers and adapted to sort the potatoes. These screens have meshes of different sizes, so that the large potatoes will remain on screen $e$, the medium potatoes will fall upon screen $f$, and the small potatoes will fall upon screen $g$, while the earth is discharged through the open bottom of box $d$.

Each of the screens is provided at its rear end with a guide for delivering the potatoes to a fixed discharge-hopper $h$, which is of the same width of box $d$ and is divided by upright partitions $h'\,h^2$ into three compartments $h^3\,h^4\,h^5$. The connection between the sieve-box and hopper is so formed that screen $e$ delivers its charge into compartment $h^3$, screen $f$ into compartment $h^4$, and screen $g$ into compartment $h^5$. To this effect each of the compartments of the hopper is provided with a short forwardly-projecting open tube $i\,i'\,i^2$, that telescopes a correspondingly-placed open tube $j\,j'\,j^2$, projecting rearwardly from the three chambers of the sieve-box $d$.

The telescoped tubes are arranged in an oblique direction, Figs. 7 and 8, in order that each of the horizontal chambers of the sieve-box may be made to deliver into one of the vertical compartments of the hopper. In order to conduct the potatoes from the screens to these obliquely-placed tubes, the rear guides on the screens are so arranged as to deliver their charge in different vertical planes. Thus the guide $e'$ of screen $e$ conducts the potatoes to the right-hand compartment $h^3$, the guides $f'\,f'$ of the screen $f$ conduct them to the central compartment $h^4$, and the guide $g'$ of screen $g$ conducts them to the left-hand compartment $h^5$. Thus it will be seen that by the obliquely-placed telescoping or extensible tubes the potatoes are properly fed to the delivery-hopper, while such tubes at the same time permit the free reciprocating motion of the sieve-box.

Each of the compartments of the hopper $h$ is provided with a rear discharge-opening $h^6\,h^7\,h^8$, that is adapted to deliver the potatoes into a separate bag $k$, placed upon a platform $l$, affixed to the rear end of frame $a$. In this way it will be seen that the potatoes are dug up, screened, assorted, and bagged in a simple and expeditious manner.

In order to disconnect the operating mechanism from the driving-gear and permit the wagon to be driven without actuating the same, the cog-wheel $c^9$ is loosely mounted upon its shaft $a^3$ and may be coupled thereto or uncoupled therefrom by a clutch $m$.

What I claim is—

1. In a potato-digger, the combination of a reciprocating sieve-box with a number of inclosed differently-meshed sieves to form a series of horizontal chambers, a fixed delivery-hopper having a series of compartments, and extensible couplings that connect the chambers of the sieve-box with the compartments of the hopper, substantially as specified.

2. In a potato-digger, the combination of a reciprocating sieve-box with a number of inclosed differently-meshed sieves to form a series of horizontal chambers, a delivery-hopper having a series of compartments, and a series of obliquely-placed telescoping tubes that connect the chambers of the sieve-box with the compartments of the hopper, substantially as specified.

3. In a potato-digger, the combination of a reciprocating sieve-box with a number of inclosed differently-meshed screens having rear delivery-guides arranged to deliver in different vertical planes, a delivery-hopper having a series of compartments, and a series of obliquely-placed telescoping tubes that connect the chambers of the sieve-box with the compartments of the hopper, substantially as specified.

CARL HARTMANN.

Witnesses:
WILLIAM SCHULZ,
F. V. BRIESEN.